United States Patent [19]
Steinmetz

[11] 3,912,287
[45] Oct. 14, 1975

[54] CHUCK APPARATUS

[76] Inventor: John C. Steinmetz, P.O. Box 672, Coer D'Alene, Idaho 83814

[22] Filed: Apr. 8, 1974

[21] Appl. No.: 459,050

Related U.S. Application Data

[63] Continuation-in-part of Ser. No. 259,589, June 5, 1972, Pat. No. 3,838,540.

[52] U.S. Cl. .................... 279/35; 279/15; 279/106
[51] Int. Cl.² ........................................ B23B 31/12
[58] Field of Search .......... 279/106, 107, 108, 109, 279/35, 1 J, 1 S; 51/219 R

[56]         References Cited
         UNITED STATES PATENTS

| | | | |
|---|---|---|---|
| 6,681 | 8/1849 | Martin et al. | 279/35 |
| 2,444,457 | 7/1948 | Marks et al. | 279/35 |
| 2,667,356 | 1/1954 | Forward | 279/106 X |
| 2,780,894 | 2/1957 | Jensch | 51/219 R X |
| 2,980,434 | 4/1961 | Hoffman | 279/106 |
| 3,005,638 | 10/1961 | McConnell | 279/106 |
| 3,494,080 | 2/1970 | Laguna | 51/219 R |

*Primary Examiner*—Gil Weidenfeld
*Attorney, Agent, or Firm*—Robert M. Ashen

[57] ABSTRACT

Chuck apparatus for holding a cutting tool or other work-piece for rotational movement about an axis. The chuck apparatus comprises generally a frame disposed around the axis and at least three jaws each having an outer portion and an inner gripping portion. The jaws are pivotally mounted at their outer portions on the frame. The jaws are spaced around the axis and extend generally inwardly toward the axis so that the inner gripping portions will converge toward the axis when the jaws are pivoted. The chuck further comprises means for controlling the pivotal movement of the jaws toward and away from the axis so that each of the gripping portions remains essentially the same distance from the axis as the other gripping portions over a gripping range for the chuck apparatus. The apparatus is particularly adapted to hold a workpiece such as a twist drill which has an irregular or discontinuous outer surface, the jaws having a length in the direction of the axis to provide sufficient points of contact between the jaws and the helical flutes of the drill to accurately center the drill and firmly hold it in that position.

7 Claims, 4 Drawing Figures

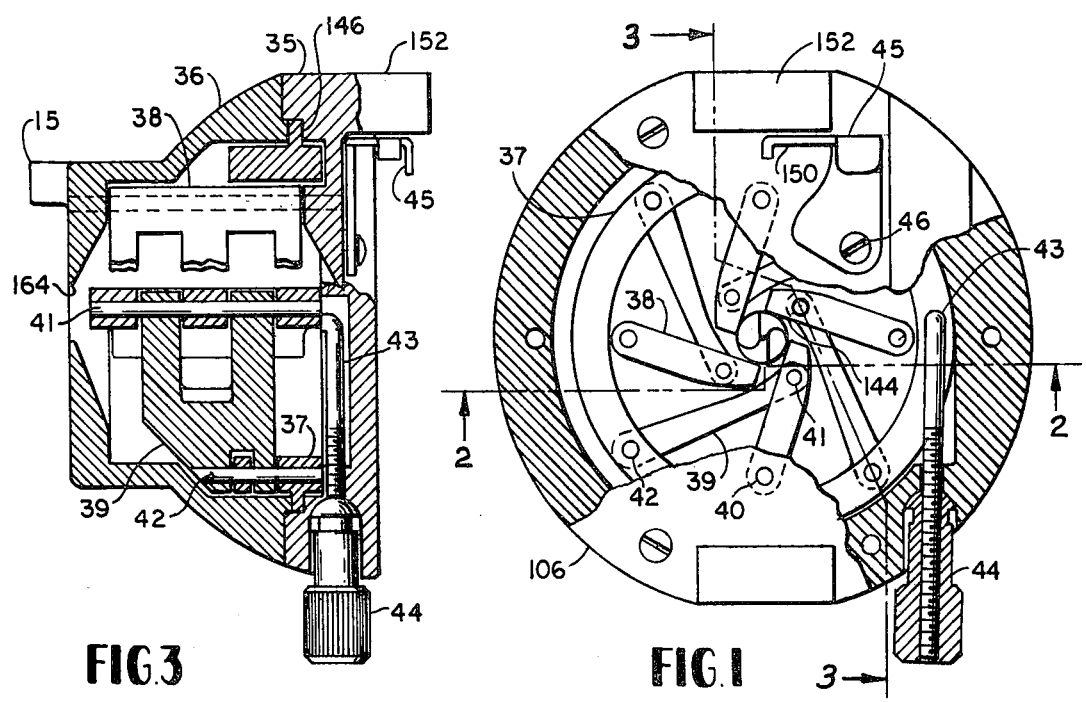
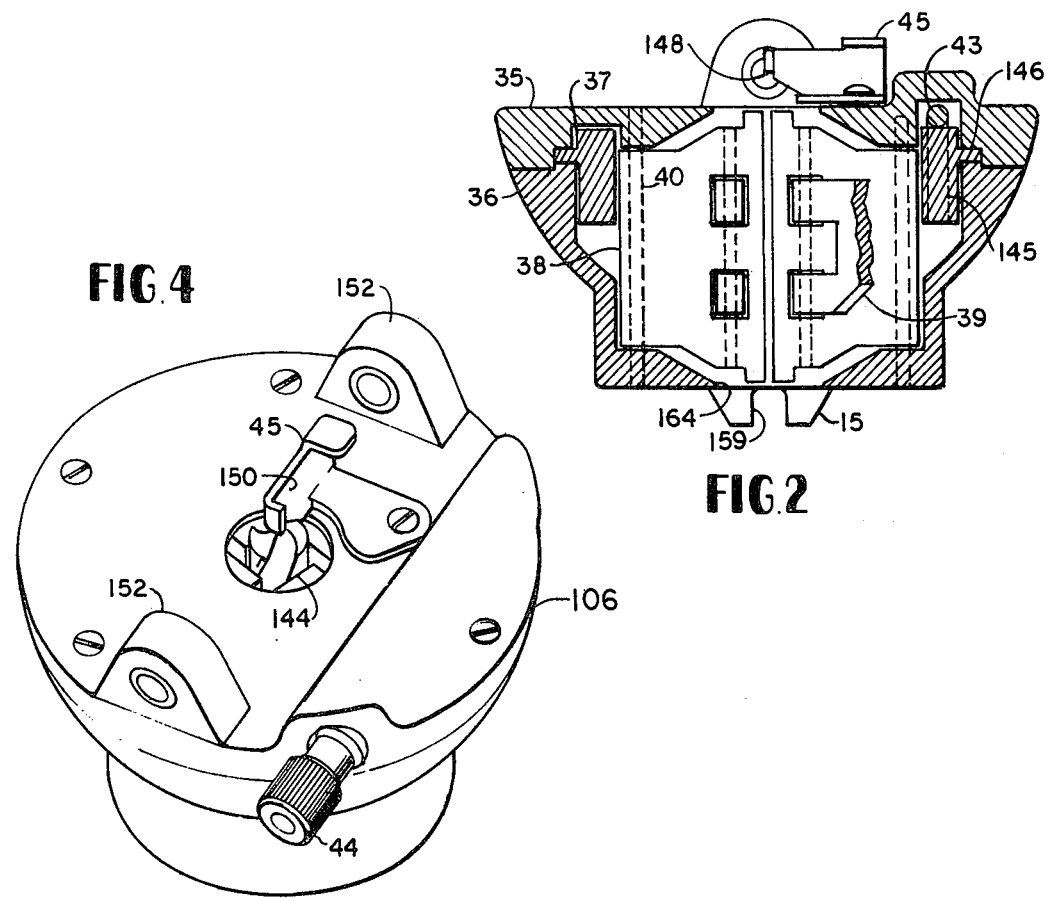
FIG.3  FIG.1
FIG.4  FIG.2

CHUCK APPARATUS

This application is a continuation-in-part of copending U.S. Pat. application Ser. No. 259,589, filed June 5, 1972, now U.S. Pat. No. 3,838,540 in the name of the same inventor, for "APPARATUS AND METHOD FOR SHARPENING DRILLS AND OTHER CUTTING TOOLS."

Regularly shaped work-pieces such as cylindrical rods present some difficulty in holding for rotation about their central axis for performing cutting, grinding or other operations on the work-piece. However, when the work-piece has an irregular, non-uniform or discontinuous configuration such as presented by a twist drill or similar cutting tool, the job of properly holding such as work-piece becomes far more difficult. Since the outer surface of such a work-piece is not the same longitudinally and/or circumferentially of the work-piece, conventional chucks may not hold such a work-piece firmly in place, or it may be held firmly but not centrally (i.e., with the axis of the work-piece aligned with the axis of rotation of the holding means). If the work-piece is not properly centered in the holding device, the work subsequently performed on the work-piece will be irregular or uneven. Using the example of a twist drill which requires sharpening at its forward or cutting end, it is necessary not only that the drill be held centrally, but that it also be held adjacent to the forward end to prevent deflection during the sharpening operation. Thus, while such a drill may be held in a center position by gripping its shaft or shank, this would not provide adequate support for the forward end of the drill and could result in deflection of the drill during the sharpening or grinding operation with the result being an uneven or unsymmetrical or otherwise improper sharpened end on the drill. On the other hand, if the drill is held in the area of its flutes by a conventional three jaw chuck, there will be inadequate points of contact between the jaws of the chuck and the helical flutes of the tool to insure proper centering of the drill.

The chuck apparatus of the present invention provides sufficient contact with the high points of the flutes of the drill to automatically and accurately center drills over a substantial range of sizes so that the axis of the drill is aligned with the axis of rotation of the chuck. The illustrated chuck apparatus comprises in general a chuck housing which contains a chuck mechanism. The illustrated chuck mechanism comprises a centering ring which is rotationally movable to operate a plurality of chuck jaws to define a central or holding opening for the drill or other work-piece to be held. The chuck mechanism will accommodate a broad range of work-piece sizes. It will tightly hold and accurately center the work-piece. It also operates to grip the work-piece close to its forward end to prevent deflection of the end when it is ground or cut. The jaws of the illustrated chuck have substantial length along the central axis of the device so that they will contact the high poins of the flutes of a cutting drill or like tool at sufficient points to center and to securely hold the tool in position.

In the drawings:

FIG. 1 is a front view, with portions broken away, of the chuck apparatus which comprises a presently preferred form of the invention.

FIGS. 2 and 3 are sectional view taken generally along lines 2—2 and 3—3, respectively, of FIG. 1.

FIG. 4 is the perspective view of the chuck apparatus shown in FIGS. 1–3.

Chuck apparatus embodying a preferred form of the invention is illustrated in FIGS. 1–4. This chuck apparatus or assembly 106 is illustrated in connection with a twist cutting drill having a pair of helical flutes terminating at the forward end or tip of the drill in cutting edges. There will be appreciated that the herein chuck apparatus is adapted to hold a variety of other work-pieces, although it is particularly adapted to and advantageous for use with a work-piece such as a drill having an outer surface with a non-uniform or discontinuous outer configuration over its length and/or circumference. The chuck apparatus is illustrated in the context of a drill sharpening machine wherein the chuck housing is pivotally mounted in a particular manner, and means are provided to achieve periodic pivoting of the chuck housing. Such pivoting feature does not comprise a part of the present invention.

Now to consider the chuck assembly 106 in further detail. In general, the chuck apparatus 106 includes a chuck housing face 35 which is generally circular in configuration and which may be secured as by means of screws arranged around its periphery to a chuck housing back 36 which is a generally annular mating part. The chuck housing thereby defines a frame or support having a central cavity within which a chuck mechanism is disposed. The chuck mechanism comprises a centering ring 37 which is moved rotationally to operate four chuck jaws 38 to define a central or holding opening for the drill or other tool or work-piece to be held. The drill is held with its longitudinal axis coaligned with the central axis or axis of rotation of the chuck. The presenst chuck mechanism will accommodate drill sizes from about 0.007 inch diameter to about 1.00 inch diameter. It will tightly hold and accurately center the drill over the full range of drill sizes just mentioned, without any adjustment of the apparatus. It also operates to grip the drill close to its point as is required to achieve proper centering and to prevent deflection of the point while the grinding of the point is taking place. In this connection, a conventional three jaw chuck will not provide adequate points of contact with the helical flutes of the drill and will therefore not adequately center and hold the drill for the grinding operation. The illustrated four jaw chuck will provide contact between high points of the flutes of the drill and the jaws of the chuck at least twice over the length of each of the jaws. In this connection, it appears that adequate support would be provided and the drill would be centered if at least two alternate jaws contact the flutes of the drill at least twice each, with the remaining two jaws contacting the flutes at least once each.

Each of the chuck jaws is a generally flat, plate-like member disposed generally radially extending with regard to the common axis of the chuck and of the drill to be sharpened. This is best seen in FIG. 1. The full depth or length of the chuck jaws 38 along the axis is seen best in FIG. 2. The outer end or edge of each chuck jaw 38 is pivotally mounted on a jaw hinge pin 40 which extends between and is secured at its ends in the chuck housing face 35 and the chuck housing back 36. Each of the chuck jaws 38 has a gripping surface portion 144 and each chuck jaw is so configured and positioned so that when the centering ring 37 is rotated clockwise, the jaws 38 converge so that the outermost portion of the surface 144 will be approximately at the chuck axis. As the centering ring 37 is rotated counterclockwise, the jaws 38 will be made to pivot by equal amounts away from center so that the gripping surfaces 144 define four planes around a circle of progressively increasing diameter, which circle has its center at the axis. Thus, as shown in FIG. 1, the gripping surfaces 144 are shown gripping a drill at circumferentially equidistant points around a circle centered at the axis, which circle is coincident with the outer periphery of the drill. While the illustrated jaws 38 will converge to the axis so that drills or other work-pieces of very small diameter may be accommodated, it is possible to limit such movement of the jaws to a minimum inward position.

Movement of each of the chuck jaws 38 is controlled by a jaw centering link 39. The link is another generally radially extending plate-like member shown best in FIG. 1 and in section in FIG. 3. Each jaw centering link 39 has a pair of inwardly extending arms which are shown best in FIGS. 2 and 3. The arms of each link 39 are received in mating recesses adjacent the radially inward ends of one of the chuck jaws 38. These inwardly extending arms of the jaw centering link 39 are pivotally connected to the jaw chuck 38 by a jaw link pin 41, which extends axially and parallel to the axis, through the jaw centering link arms and through the associated chuck jaw. The outermost end of each of the jaw centering links 39 is pivotally connected by means of a ring link pin 42 to the centering ring 37. Thus, rotational movement of the centering ring 37 effects pivoting of the chuck jaws 38 through the jaw centering links 39. This rotation of the centering ring 37 is achieved by an L shaped closing screw 43, which has its inner leg 145 extending axially in a mating hole in the centering ring 37 (FIG. 2). The other leg of the screw 43 is threadably received in a closing nut 44 that is rotatively mounted on the chuck housing face 35. Rotation of the closing nut 44 causes longitudinal movement of the threaded portion of the closing screw 43 as viewed in FIG. 1, and thereby effects rotation of the centering ring 37. This rotation in turn brings the gripping surfaces 144 of the chuck jaws 38 closer together or further apart as desired. As shown best in FIGS. 2 and 3, this centering ring 37 has an outwardly extending annular flange 146 which is slidably received in a mating recess defined between the chuck housing face 35 and the chuck housing back 36, to support the centering ring while permitting its rotation.

A drill orientation pawl 45 is rotatively mounted by means of a pawl hinge screw 46 on the outer surface of the chuck housing face 35. Pawl 45 has an axial stop surface 148 (FIG. 2) adapted to engage the end of the drill and position it axially of the chuck. The pawl 45 also has a rotational stop surface 150 adapted to engage a cutting edge of the drill to thereby orient the drill rotationally within the chuck. As shown in FIG. 4, when the drill orientation pawl is rotated into the center position to engage and orient the drill, the axial stop surface 148 limits the axial position of the drill while the rotational stop surface 150 rotationally orients the drill.

As shown in the drawings, the chuck housing face 35 has a pair of upstanding ears 152 which receive the inner ends of suitable pivot pins for tilting or pivoting of the chuck assembly. Tilting of the chuck assembly 106 is achieved through engagement of members (not shown) received in axially extending slots 159 defined by a pair of pivot lugs 15 formed on and extending outwardly from the outer face of the chuck housing back 36 (see FIG. 2).

It will be noted that the pivot lugs 15 are spaced apart at opposite edges of the chuck housing back 36 (see FIG. 3). This permits the rear end of the drill to extend outwardly and rearwardly of the chuck assembly through a central opening 164 in the chuck housing back 36. The drill may be inserted into the chuck by passing it forwardly through the opening 164 and between the jaws of the chuck to the desired position.

More particularly, to position the drill or other tool in the chuck assembly, with the jaws of the chuck sufficiently opened, the pawl 45 is rotated to the center position shown in FIG. 4. The drill is then inserted through the opening 164 to the position shown best in FIG. 4. The cutting end of the drill abuts the axial stop surface 148 of the pawl while one of the cutting edges of the drill is rotated to make contact with the rotation stop surface 150 of the pawl. The closing nut 44 of the chuck is then rotated to cause the drill to be firmly grasped by the four gripping surfaces 144 of the chuck jaws 38. This serves to grasp and also center the drill so that its axis coincides with the axis of rotation of the chuck apparatus. The pawl 45 may then be rotated back to its off-center position. This orients and locks the drill rotationally with respect to the chuck assembly as well as along the rotational axis of the assembly.

While four jaws are shown in the illustrated chuck assembly, it may be desired to utilize three jaws, depending on the particular construction of the assembly and its intended use. Other modifications and changes may be made in the specific structure without departing from the spirit and scope of the present invention.

I claim:
1. a. A chuck disposed around a center axis;
  b. at least three solid one-piece jaws, each having an outer end portion and an inner end gripping portion, the jaws being pivotally mounted at their outer end portions on said frame, said jaws being equally spaced around said center axis and extending generally inwardly toward that axis so that said inner end gripping portions will converge toward said axis when said jaws are pivoted; and
  c. means for controlling pivotal movement of said jaws toward and away from said axis so that each of said end gripping portions remains essentially the same distance from said axis as the other end gripping portions over a gripping range, said control means comprising a rotatable ring means having its center at said axis, and connector means connecting each of said jaws to said ring means, whereby rotation of said ring means effects equal pivotal movement for each of said jaws, said connector means for each jaw being a rigid link member pivotally connected at one of its ends to the jaw intermediate said end portions of the jaw and being pivotally connected at the other of its ends to the ring means.

2. The chuck of claim 1 wherein said jaws have substantial length in the direction of said axis.

3. The chuck of claim 2 wherein the length of said jaws in the direction of said axis is sufficient to ensure that each jaw will make contact at least twice over its length with the helical flutes of a standard helical cutting tool held by said jaws.

4. The chuck of claim 1 adapted to hold a cutting tool having at least one standard helical flute, said jaws having sufficient length in the direction of said axis so that at least two of said jaws will each engage said flute at two or more locations spaced from one another in the direction of said axis.

5. The chuck of claim 1 having four jaws and adapted to hold a cutting tool having at least two standard helical flutes, said jaws having sufficient length in direction of said axis so that at least two of said jaws each contact said flutes at least twice.

6. The chuck of claim 1 further including means mounted on said frame for engaging the tip of a fluted cutting tool to orient the tool axially and rotationally relative to the center axis.

7. The chuck of claim 1 wherein each of said rigid link members is pivotally connected to a jaw adjacent to the inner end gripping portion of the jaw.

* * * * *